(12) United States Patent
Inuta

(10) Patent No.: US 6,966,862 B2
(45) Date of Patent: Nov. 22, 2005

(54) SHIFT CONTROL SYSTEM OF AUTOMATIC TRANSMISSION

(75) Inventor: Yukiyoshi Inuta, Shizuoka (JP)

(73) Assignee: Jatco LTD, Fuji (JP)

(*) Notice: Subject to any disclaimer, the term of this patent is extended or adjusted under 35 U.S.C. 154(b) by 0 days.

(21) Appl. No.: 10/490,161

(22) PCT Filed: Sep. 27, 2002

(86) PCT No.: PCT/JP02/10059

§ 371 (c)(1),
(2), (4) Date: Mar. 18, 2004

(87) PCT Pub. No.: WO03/029700

PCT Pub. Date: Apr. 10, 2003

(65) Prior Publication Data

US 2004/0235601 A1 Nov. 25, 2004

(30) Foreign Application Priority Data

Sep. 28, 2001 (JP) ............................. 2001-302947

(51) Int. Cl.[7] ..................... F16H 31/00; F16H 61/16; G06F 17/00; G06F 19/00; G06F 7/00
(52) U.S. Cl. ..................... 475/119; 475/120; 477/125; 477/906; 701/62
(58) Field of Search ................ 475/119–121, 132–133; 477/125, 906; 701/62–63

(56) References Cited

U.S. PATENT DOCUMENTS

| | | | |
|---|---|---|---|
| 3,738,196 A * | 6/1973 | Kubo et al. | 477/131 |
| 5,609,067 A * | 3/1997 | Mitchell et al. | 74/336 R |
| 5,613,921 A | 3/1997 | Sugiyama et al. | |
| 5,749,802 A * | 5/1998 | Tanahashi et al. | 475/120 |
| 6,024,671 A * | 2/2000 | Sawa et al. | 477/131 |

(Continued)

FOREIGN PATENT DOCUMENTS

DE 100 45 556 A1 4/2001

(Continued)

OTHER PUBLICATIONS

U.S. Appl. No. 10/489,957, filed Mar. 18, 2004, Saitou et al.

(Continued)

Primary Examiner—Tisha Lewis
(74) Attorney, Agent, or Firm—Foley & Lardner LLP

(57) ABSTRACT

In a case of an electric failure caused to a traveling vehicle and when any of forward gears is held at a step S5, a comparison is made between: 1) a supposedly-engaged friction element of friction elements which is supposed to be engaged at the any of the forward gears and 2) an actually-engaged friction element of the friction elements which is sensed to be actually engaged, the sensing being based on a switch signal from a first hydraulic pressure switch 11, a second hydraulic pressure switch 12, a third hydraulic pressure switch 13, a fourth hydraulic pressure switch 14 and a fifth hydraulic pressure switch 15. When the supposedly-engaged friction element is not in accordance with the actually-engaged friction element, an electric system is determined to be in failure. In the case of the electric failure, a routine moves to a step S6 and subsequent steps for sticking the gear of an automatic transmission to a given gear.

As described above, a shift control system of the automatic transmission is thus provided that can eliminate a sleeping failure thereby securely preventing an interlock and that can secure a high shift controllability which is not, in a period of shift, restricted in terms of hydraulic pressure control range of each of the friction elements.

6 Claims, 10 Drawing Sheets

U.S. PATENT DOCUMENTS

| | | | |
|---|---|---|---|
| 6,125,316 A * | 9/2000 | Sasaki et al. | 701/62 |
| 6,159,129 A * | 12/2000 | Holbrook et al. | 477/155 |
| 6,178,372 B1 * | 1/2001 | Tabata et al. | 701/97 |
| 6,302,822 B1 | 10/2001 | Suzuki et al. | |
| 6,398,684 B1 | 6/2002 | Kaizu | |
| 2002/0035001 A1 | 3/2002 | Takahashi | |

FOREIGN PATENT DOCUMENTS

| | | | |
|---|---|---|---|
| EP | 1 031 770 A2 | 8/2000 | |
| JP | 64-35155 A | 2/1989 | |
| JP | 8-258644 A | 10/1996 | |
| JP | 2000-46163 A | 2/2000 | |
| JP | 2000-240776 A | 9/2000 | |

OTHER PUBLICATIONS

U.S. Appl. No. 10/489,959, filed Mar. 18, 2004, Saitou et al.

U.S. Appl. No. 10/489,958, filed Mar. 18, 2004, Saitou.

* cited by examiner

| | LOW/C | 3-5R/C | H/C | L&R/B | 2-6/B | LOW/OWC |
|---|---|---|---|---|---|---|
| 1ST | ○ | | | ⊗ | | ◉ |
| 2ND | ○ | | | | ○ | |
| 3RD | ○ | ○ | | | | |
| 4TH | ○ | | ○ | | | |
| 5TH | | ○ | ○ | | | |
| 6TH | | | ○ | | ○ | |
| REV | | ○ | | ○ | | |

⊗ : ENGINE BRAKE

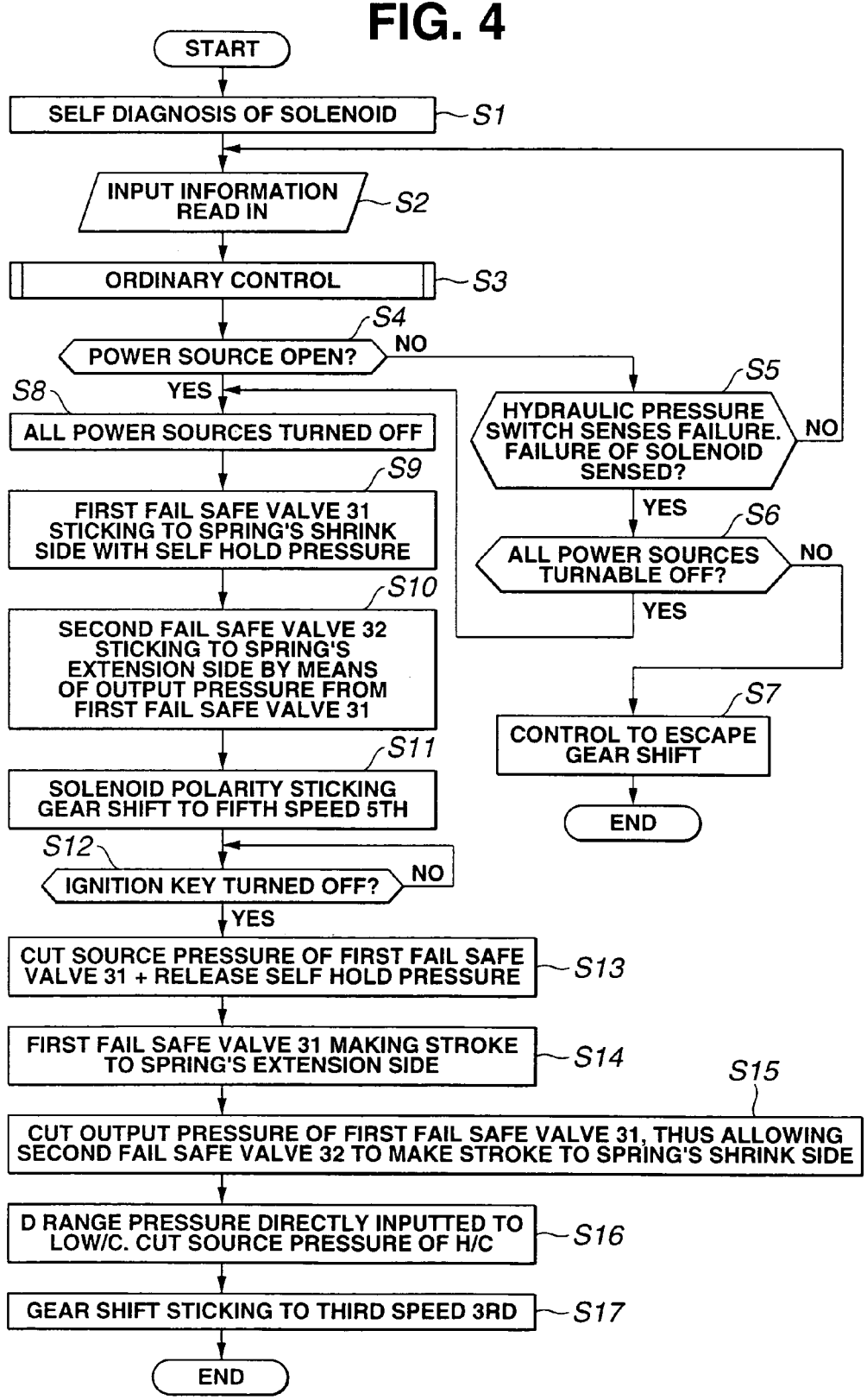

FIG. 5(a)
A: SPRING'S EXTENSION SIDE  B: SPRING'S SHRINK SIDE
○: OUTPUT   ×: NO OUTPUT
| SECTION | | 31 | 32 | | | 30 |
|---|---|---|---|---|---|---|
| | | | | L/C PRESSURE, SOURCE PRESSURE | H/C CONT. V SOURCE PRESSURE | |
| IN FAILURE (ALL POWER SOURCES TURNED OFF) | BEFORE TURNING OFF IGNITION KEY | B (LINE PRESSURE PL SELF HOLD) | A | — | D RANGE PRESSURE | × FAILURE, FIFTH SPEED 5TH |
| | AFTER TURNING OFF IGNITION KEY | A | B | D RANGE PRESSURE | DRAIN | × FAILURE, THIRD SPEED 3RD |
FIG. 5(b)
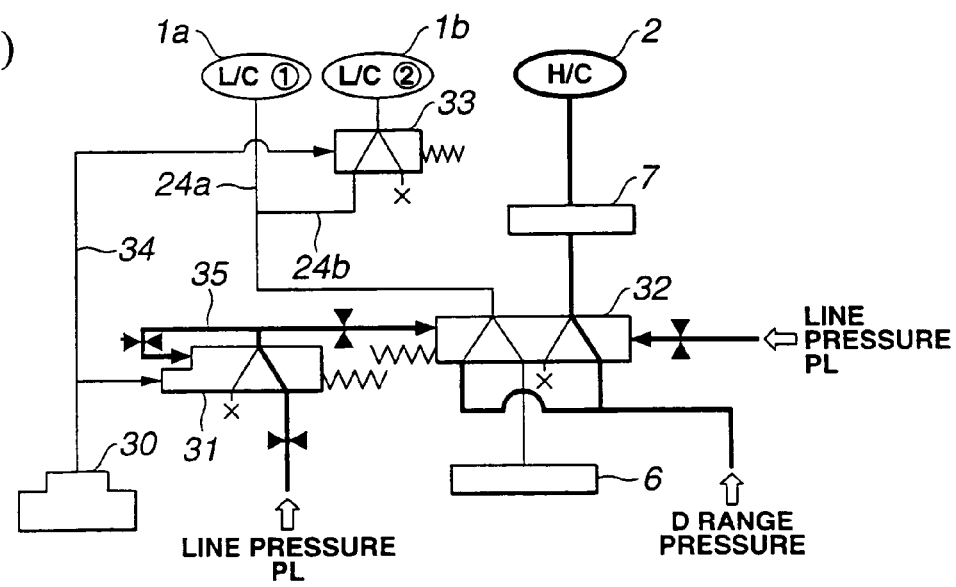
FIG. 5(c)
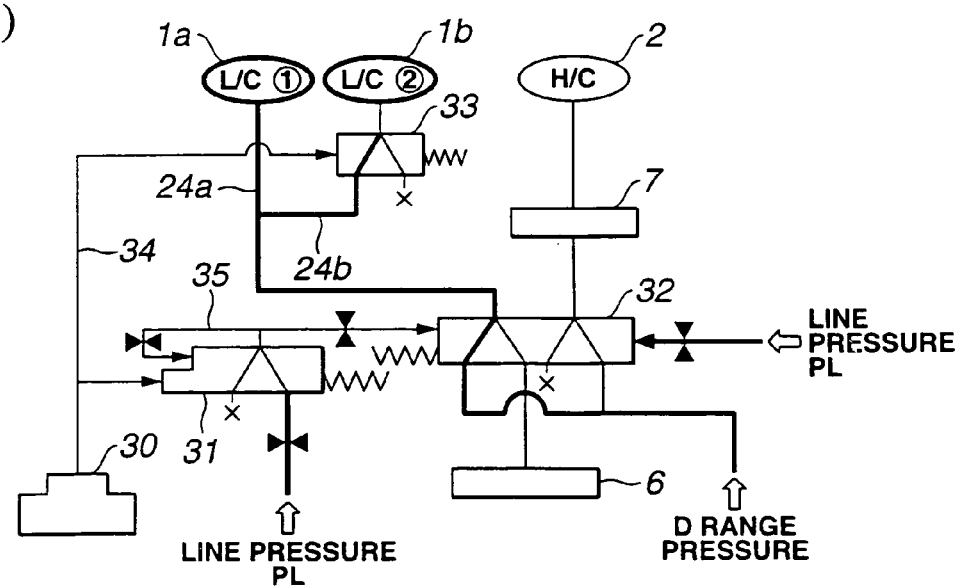

FIG. 6
ELECTRIC FAILURE WITH FOURTH SPEED 4TH CHANGED TO FIFTH SPEED 5TH
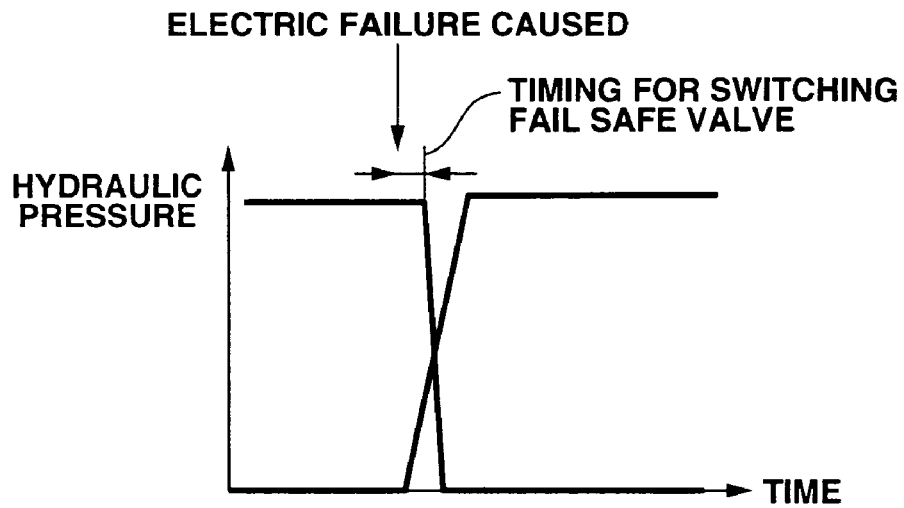
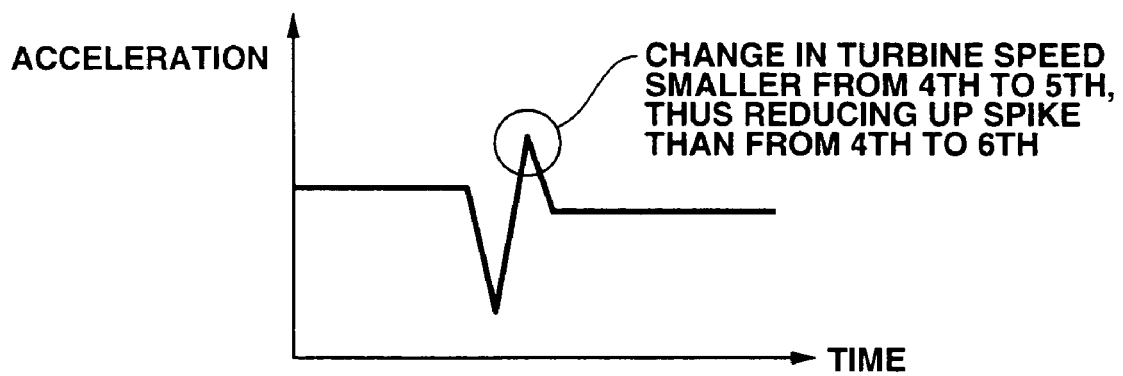
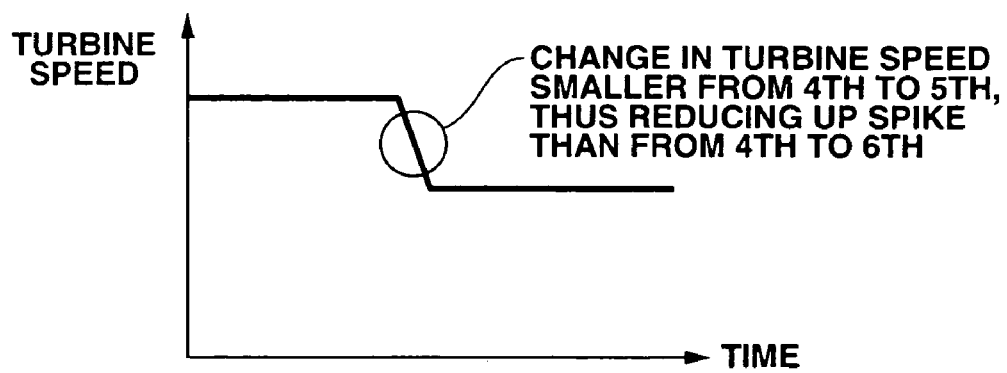

FIG. 7
ELECTRIC FAILURE WITH SIXTH SPEED 6TH CHANGED TO FIFTH SPEED 5TH
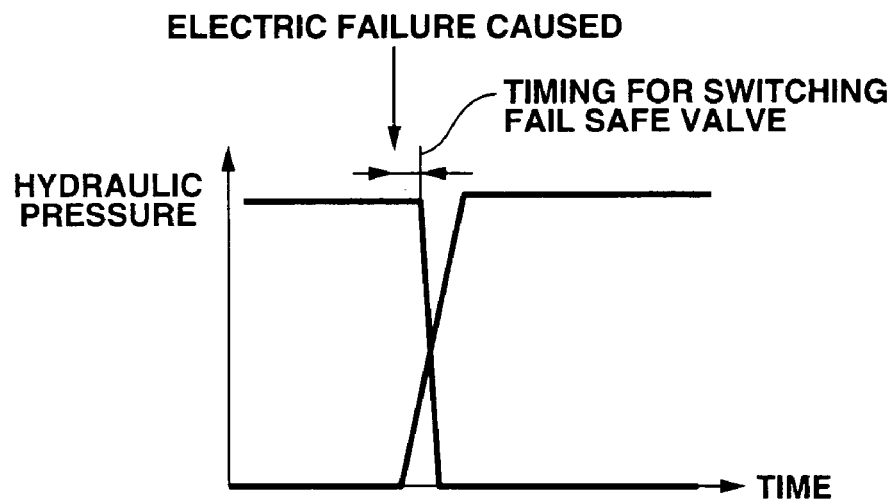
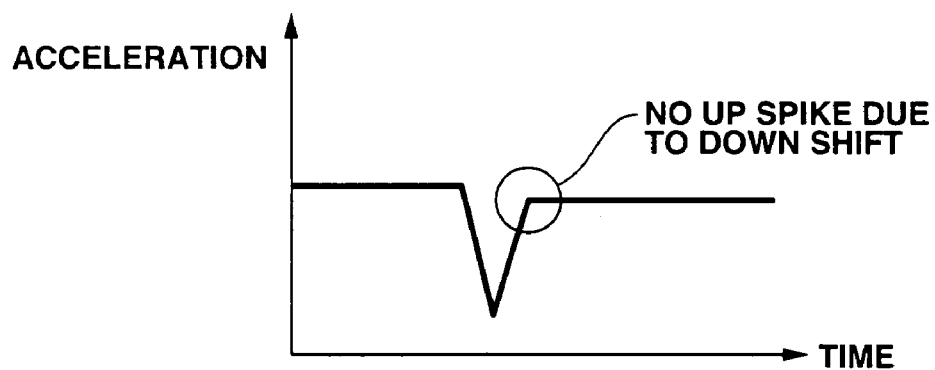
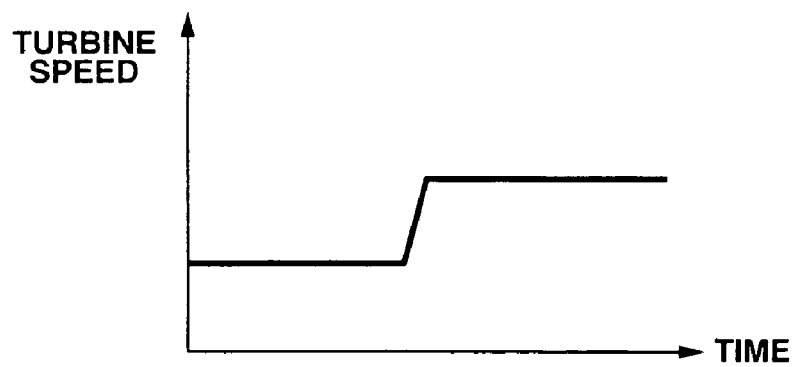

SHIFT CONTROL SYSTEM OF AUTOMATIC TRANSMISSION

TECHNICAL FIELD

The present invention relates to a shift control system of an automatic transmission having a hydraulic pressure circuit which is constituted of solenoid hydraulic pressure control valves for controlling individually an engagement pressure and a disengagement pressure to a plurality of friction elements related to shift of the automatic transmission.

BACKGROUND TECHNIQUE

A conventionally known shift control system of an automatic transmission is disclosed in Japanese Patent Unexamined Publication No. 2000-240776.

Described in the above publication includes a technology for changing gear from first speed 1ST, second speed 2ND and third speed 3RD to third speed 3RD and from fourth speed 4TH, fifth 5TH and sixth speed 6TH to sixth speed 6TH in a case of an electric failure caused to a traveling vehicle.

Thereby, change of a gear to lower than a gear of the traveling vehicle can be avoided, thus preventing sudden engine brake or engine's excessive high speed. In addition, the third speed 3RD capable of causing a great driving force sufficient for start signifies that the driving force can be secured for the vehicle to travel.

As is seen in FIG. 9 (FIG. 11 on page 20 of the above publication), the shift control system of the automatic transmission according to the above conventional technology, however, changes the gear from the first speed 1ST, second speed 2ND and third speed 3RD to the third speed 3RD while from the fourth speed 4TH, fifth 5TH and sixth speed 6TH to the sixth speed 6TH in the electric failure by means of a fail safe valve 77, a fail safe valve 78, a fail safe valve 79, a fail safe valve 80 and a fail safe valve 81 each of which operates with pressure of one of respective friction elements as an operation signal pressure. Therefore, the shift control system of the automatic transmission according to the above conventional technology may cause an insensible failure which may be attributable, for example, to the fail safe valve 77 sticking to a spring's extension side (hereinafter, the insensible failure is referred to as a sleeping failure), thus causing an interlock.

Namely, a duty solenoid SLC1 cutting a C-1 hydraulic pressure contributes to trouble-free (sleeping failure), when the fail safe valve 77 sticks (in failure) to the spring's extension side at an ordinary fifth speed 5TH. In this state, however, the following failures may cause the interlock attributable to simultaneous engagements of a plurality of friction elements: 1. the electric failure, 2. cutting of the duty solenoid SLC1, or 3. the duty solenoid SLC1 sticking to the hydraulic pressure output side. Substantially the like phenomenon is supposed to hold true to the fail safe valve 78, the fail safe valve 79, the fail safe valve 80 and the fail safe valve 81 in the sleeping failure.

Disposed between the duty solenoids and the friction elements include the fail safe valve 77, the fail safe valve 78, the fail safe valve 79, the fail safe valve 80 and the fail safe valve 81 and the like each of which operates with the pressure of one of the respective friction elements as the operation signal pressure. With the above constitution, changing the gear may output three or more of the hydraulic pressures substantially simultaneously. Thereby, controlling at high hydraulic pressure may cause malfunction to the fail safe valve 77, the fail safe valve 78, the fail safe valve 79, the fail safe valve 80 and the fail safe valve 81 and the like, thus restricting hydraulic pressure control range and deteriorating shift controllability.

In addition, achieving the gear change from the first speed 1ST, second speed 2ND and third speed 3RD to the third speed 3RD while from the fourth speed 4TH, the fifth speed 5TH and sixth speed 6TH to the sixth speed 6TH may use three long (overall length) fail safe valves (namely, the fail safe valve 77, the fail safe valve 78, and the fail safe valve 81) having two shifts, and two fail safe valves (namely, the fail safe valve 79, and the fail safe valve 80), thus complicating the layout and increasing a control valve unit in size.

In addition, the gear change from the fourth speed 4TH, the fifth speed 5TH and the sixth speed 6TH to the sixth speed 6TH in the electric failure involves a maximum gear change of two (fourth speed 4TH to sixth speed 6TH), thus causing an excessive shock (down spike and up spike).

In other words, the gear change in the electric failure from the fourth speed 4TH to the sixth speed 6TH is likely to cause the interlock due to an excessive capacity of both the engagement and disengagement as is seen in FIG. 10, thus causing the down spike. Moreover, a momentary great change in turbine speed may cause the up spike. En passant, FIG. 11 shows a resultant diagram of an up shift simulation of changing the gear from the fourth speed 4TH to the sixth speed 6TH in the case of fuse cut (electric failure) caused to the vehicle traveling at 230 km/h with fourth speed 4TH. The up shift simulation from the fourth speed 4TH to the sixth speed 6TH causes deceleration of −0.25 G and up spike acceleration of +0.21 G, thus causing acceleration-deceleration range of 0.46 G (>0.4 G).

DISCLOSURE OF THE INVENTION

In view of the above problems, the present invention has been invented. It is an object of the present invention to provided a shift control system of an automatic transmission that can securely prevent an interlock by eliminating a sleeping failure, and that can secure a high shift controllability which is not, in a period of shift, restricted in terms of hydraulic pressure control range of each of friction elements.

For achieving the above object, there is provided a shift control system of an automatic transmission, as claimed in claim 1 of the present invention.

A hydraulic pressure circuit has a constitution provided with solenoid hydraulic pressure control valves for controlling individually an engagement pressure and a disengagement pressure to a plurality of friction elements related to a shift of the automatic transmission. The shift control system of the automatic transmission includes a shift controlling means for achieving a plurality of forward gears by outputting the following commands when the shift is requested;

an engagement pressure control command to the solenoid hydraulic pressure control valves of the friction elements which is disengaged at a gear before the shift and is engaged at a gear after the shift, and a disengagement pressure control command to the solenoid hydraulic pressure control valves of the friction elements which is engaged at the gear before the shift and is disengaged at the gear after the shift.

The shift control system of the automatic transmission comprises:

1) a hydraulic pressure sensing means for sensing whether or not a pressure of the friction elements is present, the hydraulic pressure sensing means being disposed on the plurality of the friction elements or each of engagement-disengagement hydraulic pressure passages;

2) an electric failure determining means for determining that an electric system is in failure through:

a comparison between the following friction elements, when a hydraulic pressure sensing signal is inputted from the hydraulic pressure sensing means and when any of the forward gears is held:

a supposedly-engaged friction element of the friction elements which is supposed to be engaged at the any of the forward gears, and an actually-engaged friction element of the friction elements which is sensed by the hydraulic pressure sensing signal to be actually engaged, and a determination that the supposedly-engaged friction element is not in accordance with the actually-engaged friction element; and 3) an electric failure interlock escaping means for sticking the gear of the automatic transmission to a given gear when the electric failure determining means determines that the electric failure is caused.

According to the above aspect of the present invention as claimed in claim 1, in the case of the electric failure caused to the traveling vehicle, the electric failure determining means inputs the hydraulic pressure sensing signal from the hydraulic pressure sensing means for sensing whether or not the pressure of the friction elements is present. When the any of the forward gears is held, the electric failure determining means makes the comparison between the supposedly-engaged friction element of the friction elements and the actually-engaged friction element of the friction elements which is sensed by the hydraulic pressure sensing signal to be actually engaged. When the supposedly-engaged friction element is not in accordance with the actually-engaged friction element, the electric failure determining means determines that the electric system is in failure. When the electric failure determining means determines that the electric failure is caused, the electric failure interlock escaping means sticks the gear of the automatic transmission to the given gear.

In other words, unlike the conventional technology disclosing that the electric failure sensing function and the electric failure interlock escaping function are assumed responsibility for by the fail safe valve alone that operates with the pressure of each of the friction elements as operation signal pressure, the aspect of the present invention has divided functions, namely, the electric failure sensing function is carried out by the electric failure determining means with the sensing function based on the hydraulic pressure sensing signal from the hydraulic pressure sensing means, while the electric failure interlock escaping function is carried out by the electric failure interlock escaping means for sticking the gear to its given position with the escaping function based on an electric failure determination result.

In sum, use of the hydraulic pressure sensing means for sensing the electric failure can eliminate the insensible sleeping failure which is attributable to the sticking fail safe valve, thus securely preventing the interlock. In addition, eliminating the need for providing between the solenoid hydraulic pressure control valves and the friction elements the fail safe valve which operates with the pressure of each of the friction elements as operation signal pressure can secure high shift controllability which is not, in a period of shift, restricted in terms of hydraulic pressure control range of each of the friction elements.

Described below is according to the aspect of the present invention as claimed in claim 2. The shift control system of the automatic transmission as claimed in claim 1 is described as below:

the shift control system further comprises an all-power source OFF control determining means for determining, based on an engagement-disengagement state of the friction elements, a capability of turning off all power source, when the electric failure determining means determines that the electric failure is caused, and when the all power source is determined to be incapable of being turned off, the electric failure interlock escaping means is so controlled as to stick the gear of the automatic transmission to an escape gear provided for each failure mode; while when the all power source is determined to be capable of being turned off, the electric failure interlock escaping means is so controlled, with the all power source turned off, as to stick the gear of the automatic transmission to the given gear.

According to the aspect of the present invention as claimed in claim 2, when the electric failure determining means determines that the electric failure is caused, the all-power source OFF control determining means determines whether or not the all power sources can be turned off. When the all-power source OFF control determining means determines the incapability of turning off the all power sources, the electric failure interlock escaping means carries out the control for sticking the gear to the escape gear which is provided for each of the failure modes. When the all-power source OFF control determining means determines the capability of turning off the all power sources, the electric failure interlock escaping means carries out the control for sticking the gear to its given position with the all power sources turned off. With this, in the case of the electric failure with the capability of turning off the all power sources, the routine carries out an easy control using the solenoid polarity with the all power sources turned off, thus sticking the gear to its given position.

Described below is according to the aspect of the present invention as claimed in claim 3. The shift control system of the automatic transmission as claimed in claim 2 is described as below:

the shift controlling means is a means for achieving six forward gears, and the electric failure interlock escaping means is a means for turning off the all power source and sticking the gear to a fifth speed when:

the electric failure determining means determines that the electric failure is caused, and the all-power source OFF control determining means determines that the all power source is capable of being turned off.

According to the aspect of the present invention as claimed in claim 3, with the electric failure determined by the electric failure determining means to occur and with the all power sources determined by the all-power source OFF control determining means to be turnable off, the routine turns off the all power sources and controls the gear to stick to the fifth speed 5TH among the six forward gears, thus bringing about the gear change from the fourth speed 4TH to the fifth speed 5TH, from the fifth speed 5TH to the fifth speed 5TH, and from the sixth speed 6TH to the fifth speed 5TH in the electric failure which may be caused to the high gear (fourth speed 4TH, fifth speed 5TH, and sixth speed 6TH) traveling vehicle. As a result, the above gears can prevent any excessive shock which may be caused by the gear change, for example, from the fourth speed 4TH to the sixth speed 6TH.

Described below is according to the aspect of the present invention as claimed in claim 4. The shift control system of the automatic transmission as claimed in claim 3 is described as below:

the shift controlling means is a means for achieving a third speed by engaging a first friction element with a second friction element as a common friction element and for achieving a fifth speed by engaging a third friction element with the second friction element as the common friction element, the solenoid hydraulic pressure control valves include a fourth solenoid hydraulic pressure control valve for the second friction element and a second solenoid hydraulic pressure control valve for the third friction element, the fourth solenoid hydraulic pressure control valve and the second solenoid hydraulic pressure control valve supplying the engagement pressure, respectively, to the second friction element and the third friction element in an electrically turned off state, and a fail safe valve is disposed on an engagement hydraulic pressure passage of the first friction element and on an engagement hydraulic pressure passage of the third friction element, when the all power source is turned off and before an ignition key is turned off, the fail safe valve supplying the engagement pressure to the third friction element while cutting the engagement pressure of the first friction element, and for a restart after the ignition key is turned off, the fail safe valve cutting the engagement pressure of the third friction element while supplying the engagement pressure to the first friction element.

According to the aspect of the present invention as claimed in claim 4, with the electric failure determined by the electric failure determining means to occur and with the all power sources determined by the all-power source OFF control determining means to be turnable off; the electric failure interlock escaping means before turning off the ignition key and with the all power sources turned off may engage the second friction element and engage, via the fail safe valve, the third friction element, while the electric failure interlock escaping means for restart after turning off the ignition key may engage the second friction element and engage the first friction element by switching the fail safe valve for cutting the engagement pressure of the third friction element.

In other words, with the all power sources turned off before turning off the ignition key, the routine sticks the gear to the fifth speed 5TH by engaging the second friction element and the third friction element, while for restart after turning off the ignition key, the routine sticks the gear to the third speed 3RD by engaging the first friction element and the second friction element. Thus, the routine can prevent the excessive shock which may be caused in the electric failure to the high gear traveling vehicle and can compatibly secure restartability after the electric failure.

Described below is according to the aspect of the present invention as claimed in claim 5. The shift control system of the automatic transmission as claimed in claim 4 is described as below:

the fail safe valve includes:
a solenoid valve,
a first fail safe valve outputting a hydraulic pressure with a solenoid pressure outputted from the solenoid valve as an operation signal pressure, the first fail safe valve having a self hold function for holding a self hydraulic pressure output by a self output hydraulic pressure with the outputted hydraulic pressure operating in a direction same as a direction of the solenoid pressure, and a second fail safe valve selecting, with the hydraulic pressure outputted from the first fail safe valve as an operation signal pressure, a side for supplying the engagement pressure to the third friction element when the hydraulic pressure of the first fail safe valve is outputted, while the second fail safe valve selecting, with the hydraulic pressure outputted from the first fail safe valve as the operation signal pressure, a side for supplying the engagement pressure to the first friction element when the hydraulic pressure of the first fail safe valve is not outputted.

According to the aspect of the present invention as claimed in claim 5, the solenoid valve outputting the solenoid pressure may so switch the valve position as to allow the first fail safe valve to cut the hydraulic pressure passage of the first friction element while connect the hydraulic pressure passage to the third friction element. Substantially simultaneously with this, the thus outputted hydraulic pressure applied from the direction same as the direction of the solenoid valve may keep the thus switched valve position. Thereafter, whether or not the solenoid pressure is outputted from the solenoid valve, the first fail safe valve can keep outputting the hydraulic pressure (self hold pressure). When the first sail safe valve keeps outputting the hydraulic pressure, the second fail safe valve may select the position for supplying the engagement pressure to the third friction element. On the other hand, when the first sail safe valve keeps not outputting the hydraulic pressure, the second fail safe valve may select the position for supplying the engagement pressure to the first friction element.

In other words, the solenoid valve, the first fail safe valve and the second fail safe valve constitute the system that can select two gears in the electric failure. The thus constituted system can facilitate valve layout and make control valve unit smaller, as compared with the conventional technology for selecting the two gears in the electric failure.

Described below is according to the aspect of the present invention as claimed in claim 6. The shift control system of the automatic transmission as claimed in claim 5 is described as below:

the first friction element has a first engagement piston chamber and a second engagement piston chamber which are engageable in accordance with an engagement capacity request, a switch valve is disposed on the engagement hydraulic pressure passage to the first friction element, the switch valve making a first switching operation of supplying the hydraulic pressure to both of the first engagement piston chamber and the second engagement piston chamber and a second switching operation of supplying the hydraulic pressure to the first engagement piston chamber, and the solenoid valve acts as a one common solenoid valve for causing an operation signal pressure of the switch valve and for constituting the fail safe valve.

According to the aspect of the present invention as claimed in claim 6, the solenoid valve is a solenoid valve for causing the operation signal pressure of the switch valve disposed on the engagement hydraulic pressure passage to the first friction element having the first engagement piston chamber and the second engagement piston chamber which are engaged in accordance with engagement capacity request. Moreover, the solenoid valve constitutes the fail safe solenoid valve. The above common solenoid valve helps reduce the number of component parts and cost, as compared with the solenoid valves equipped for carrying out the above respective functions.

In other words, the solenoid valve 30 (for bringing about the solenoid pressure to the first fail safe valve) outputting even once the solenoid pressure may, whether or not the solenoid pressure is outputted thereafter, allow the first fail safe valve 31 to keep outputting the self hold pressure. Thereby, in the case that the solenoid valve is provided in advance for bringing about the operation pressure signal of the switch valve, adding the two fail safe valves can constitute the system for selecting the two gears in the electric failure.

BRIEF EXPLANATION OF THE DRAWINGS

FIG. 4 shows a flow chart showing fail safe control processes carried out by an automatic transmission control unit and fail safe operation involved by the fail safe control processes, according to the first mode for carrying out.

FIGS. 5(a)–5(c) explain the fail safe operation with the shift control system of the automatic transmission, according to the first mode for carrying out.

FIG. 6 shows characteristics of hydraulic pressure, acceleration and turbine speed when the shift control system of the automatic transmission according to the first mode for carrying out changes the gear from fourth speed 4TH to fifth speed 5TH (up shift) in an electric failure.

FIG. 7 shows characteristics of the hydraulic pressure, the acceleration and the turbine speed when the shift control system of the automatic transmission according to the first mode for carrying out changes the gear from sixth speed 6TH to fifth speed 5TH (down shift) in the electric failure.

BEST MODE FOR CARRYING OUT THE INVENTION

Hereinafter described based on drawings is a mode for carrying out the present invention, corresponding to claim 1 to claim 6, which mode achieves a shift control system of an automatic transmission.

(First Mode for Carrying Out)

Described at first is a constitution.

Figures 1, 2:
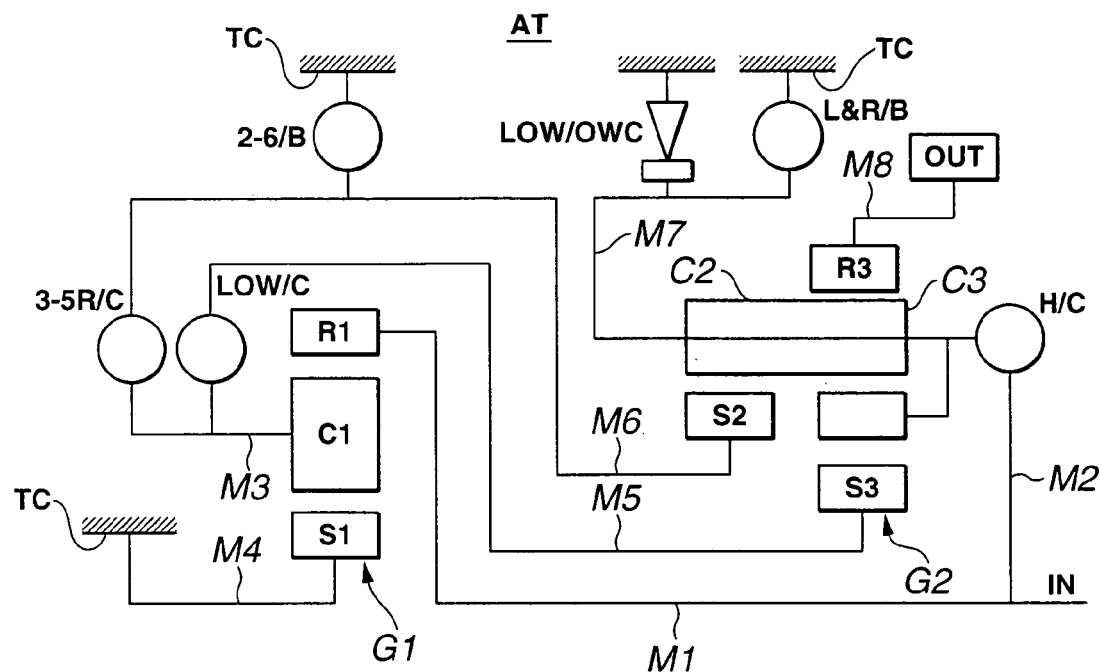
FIG. 1 is a skeleton diagram showing a gear train of an automatic transmission having six forward gears and one reverse gear, where a shift control system according to a first mode for carrying out is applied to the automatic transmission.
FIG. 2 is a table showing operation of each of friction elements in shift control with the shift control system of the automatic transmission, according to the first mode for carrying out.

FIG. 1 is a skeleton diagram showing a gear train of an automatic transmission having six forward gears and one reverse gear, where a shift control system according to the mode for carrying out is applied to the automatic transmission. The automatic transmission uses, as the gear train, a combination of one simple planet gear set G1 and one Ravigneaux gear set G2. The simple planet gear set G1 is constituted of a first sun gear S1, a first carrier C1, and a first ring gear R1. The Ravigneaux gear set G2 is constituted of a second sun gear S2, a second carrier C2, a third sun gear S3, a third carrier C3, and a third ring gear R3.

Moreover, there is provided an input shaft IN to which an engine driving force is inputted by way of an engine (not shown) and a torque converter (not shown). The input shaft IN directly connects to the first ring gear R1 by way of a first member M1, and also connects to the third carrier C3 by way of a second member M2 and a high clutch H/C.

The first carrier C1 connects to the third sun gear S3 by way of a third member M3, a low clutch LOW/C and a fifth member M5, and also connects to the second sun gear S2 by way of the third member M3, a 3-5 reverse clutch 3-5 R/C, and a sixth member M6. Herein, the sixth member M6 is fixed to a transmission case TC by way of a 2-6 brake 2-6/B.

The first sun gear S1 is fixed to the transmission case TC by way of a fourth member M4. The second carrier C2 is fixed to the transmission case TC by way of a seventh member M7, a low & reverse brake L & R/B, and a low one-way clutch LOW/OWC which latter two members are arranged in parallel. The third ring gear R3 connects to an output gear OUT by way of an eighth member M8.

Based on an operation point determined from a vehicular speed and a throttle opening and based on a shift schedule, the above automatic transmission carries out automatic six forward gears control in a D range position. Selecting from the D range position to an R range position can change the shift control to the one reverse gear. FIG. 2 shows an operation list showing each friction element of the shift control. In FIG. 2, a void circle signifies an engaged state, an empty block signifies a disengaged state, X in the void circle signifies the engaged state in an engine brake, and a hatched circle signifies a mechanical operation in an engine driving period.

A first speed 1ST is achieved through engagement of the low clutch LOW/C and the low & reverse brake L & R/B. At the first speed 1ST, rotation of the input shaft IN reduced through the first member M1 and the simple plant gear set G1 is inputted to the third sun gear S3 by way of the third member M3, the low clutch LOW/C, and the fifth member M5. Engaging the low one-way clutch LOW/OWC may fix the second carrier C2 to the transmission case TC. Then, the third ring gear R3 is reduced in rotation while receiving a reaction from the thus fixed second carrier C2, so that reduced rotation at the maximum reduction ratio is outputted from the output gear OUT by way of the eighth member M8.

In the engine brake, the low & reverse brake L & R/B receives a reaction in place of the low one-way clutch LOW/OWC which is idling.

A second speed 2ND is achieved through engagement of the low clutch LOW/C and the 2-6 brake 2-6/B. At the second speed 2ND, rotation of the input shaft IN reduced through the first member M1 and the simple planet gear set G1 is inputted to the third sun gear S3 through the third member M3, the low clutch LOW/C and the fifth member M5. Engaging the 2-6 brake 2-6/B may fix the second sun gear S2 to the transmission case TC. Then, the third ring gear R3 is reduced in rotation while receiving a reaction from the thus fixed second sun gear S2, so that reduced rotation at a reduction ratio smaller than that of the first speed 1ST is outputted from the output gear OUT through the eighth member M8.

Third speed 3RD is achieved through engagement of the low clutch LOW/C and the 3-5 reverse clutch 3-5 R/C. At the third speed 3RD, rotation of the input shaft IN reduced through the first member M1 and the simple plant gear set G1 is inputted to the third sun gear S3 through the third member M3, the low clutch LOW/C, and the fifth member M5, and also to the second sun gear S2 through the third member M3, the 3-5 reverse clutch 3-5 R/C, and the sixth member M6, achieving direct coupling f the Ravigneaux-type composite planet gear set G2. Thus, the third ring gear R3 is rotated in the same rotation as those of the second sun gear S2 and the third sun gear S3, so that reduced rotation at a reduction ratio smaller than that of the second speed 2ND is outputted from the output gear OUT through the eighth member M8.

Fourth speed 4TH is achieved through engagement of the low clutch LOW/C and the high clutch H/C. At the fourth speed 4TH, on the one hand, rotation of the input shaft IN reduced through the first member M1 and the simple planet gear set G1 is inputted to the third sun gear S3 through the third member M3, the low clutch LOW/C, and the fifth member M5. On the other hand, rotation of the input shaft IN without being reduced (namely, with the input rotation kept) is inputted to the third carrier C3 through the second member M2 and the high clutch H/C. The third ring gear R3 is rotated at substantially the middle rotation rate between the two input-rotation rates, so that rotation slightly reduced relative to input rotations is outputted from the output gear OUT through the eighth member M8.

Fifth speed 5TH is achieved through engagement of the 3-5 reverse clutch 3-5 R/C and the high clutch H/C. At the fifth speed 5TH, on the one hand, rotation of the input shaft IN reduced through the first member M1 and the simple plant gear set G1 is inputted to the second sun gear S2 through the third member M3, the 3-5 reverse clutch 3-5 R/C, and the sixth member M6. On the other hand, rotation of the input shaft IN without being reduced (namely, with the input rotation kept) is inputted to the third carrier C3 through the second member M2 and the high clutch H/C. The third ring gear R3 is rotated in such a manner as to be restricted by the two rotations, so that rotation slightly increased relative to input rotations is outputted from the output gear OUT through the eighth member M8.

Sixth speed 6TH is achieved through engagement of the high clutch H/C and the 2-6 brake 2-6/B. At the sixth speed 6TH, rotation of the input shaft IN without being reduced (namely, with the input rotation kept) is inputted to the third carrier C3 through the second member M2 and the high clutch H/C. Engaging the 2-6 brake 2-6/B may fix the second sun gear S2 to the transmission case TC. Then, the third ring gear R3 is increased in rotation while receiving a reaction from the thus fixed second sun gear S2, so that rotation further increased relative to fifth speed 5TH is outputted, from the output gear OUT through the eighth member M8.

Reverse speed REV is achieved through engagement of the 3-5 reverse clutch 3-5 R/C and the low & reverse brake L & R/B. At the reverse speed REV, rotation of the input shaft IN reduced through the first member M1 and the simple planet gear set G1 is inputted to the second sun gear S2 through the third member M3, the 3-5 reverse clutch 3-5 R/C, and the sixth member M6. Engaging the low & reverse brake L & R/B may fix the second carrier C2 to the transmission case TC. Then, the third ring gear R3 is rotated in the reverse direction while receiving a reaction from the thus fixed second carrier C2, so that reduced reverse rotation is outputted from the output gear OUT through the eighth member M8.

Figure 3:
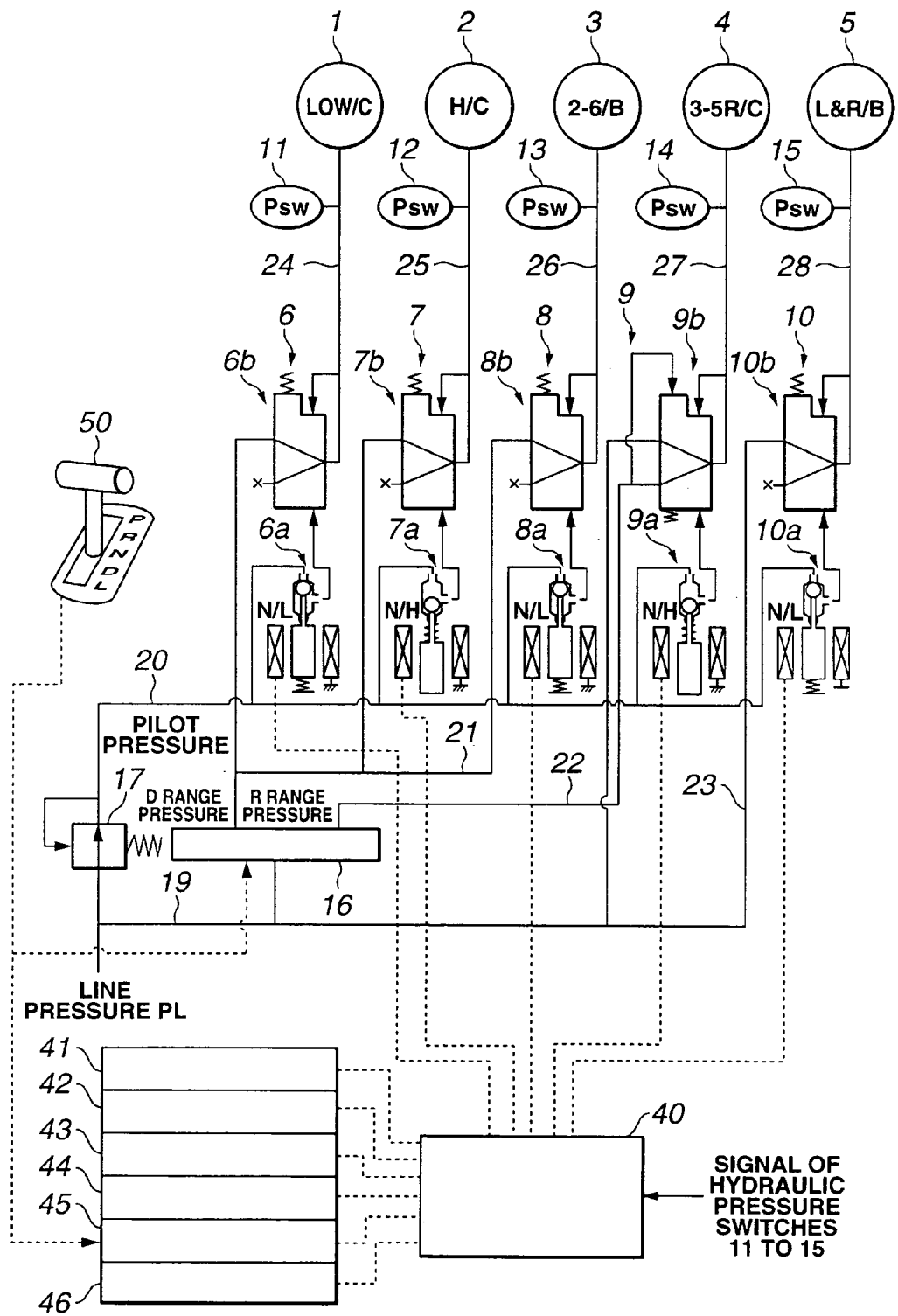
FIG. 3 shows a diagram showing hydraulic pressure circuit and electronic shift control system of the shift control system of the automatic transmission, according to the first mode for carrying out.

Referring to FIG. 3 and FIGS. 5(a)–5(c), a hydraulic pressure circuit and an electronic shift control system for achieving the above shift control are described in terms of constitution. Referring to FIG. 3, there are provided a first engagement piston chamber 1a of the low clutch LOW/C (first friction element), a second engagement piston chamber 1b of the high clutch H/C (first friction element), an engagement piston chamber 2 of the high clutch H/C (third friction element), an engagement piston chamber 3 of the 2-6 brake 2-6/B, an engagement piston chamber 4 of the 3-5 reverse clutch 3-5 R/C (second friction element), and an engagement piston chamber 5 of the low & reverse brake L & R/B. In sum, the low clutch LOW/C has the above two engagement piston chambers, namely, the first engagement piston chamber 1a and the second engagement piston chamber 1b to be engageable in accordance with an engagement capacity request.

Referring to FIG. 3, there are provided a first solenoid hydraulic pressure control valve 6 for controlling the engagement pressure to the low clutch LOW/C, a second solenoid hydraulic pressure control valve 7 for controlling the engagement pressure to the high clutch H/C, a third solenoid hydraulic pressure control valve 8 for controlling the engagement pressure to the 2-6 brake 2-6/B, a fourth solenoid hydraulic pressure control valve 9 for controlling the engagement pressure to the 3-5 reverse clutch 3-5 R/C, and a fifth solenoid hydraulic pressure control valve 10 for controlling the engagement pressure to the low & reverse brake L & R/B.

The first solenoid hydraulic pressure control valve 6 comprises a first duty solenoid 6a for producing the shift control pressure by a solenoid force with the pilot pressure as source pressure, and a first pressure regulator valve 6b for regulating the low clutch pressure with the D range pressure as source pressure and the shift control pressure and feedback pressure as operation signal pressure. The first duty solenoid 6a is controlled in accordance with the duty ratio in such a manner as to bring the low clutch pressure to zero when the solenoid is turned off, and increase the low clutch pressure with an increase in the ON duty ratio when the solenoid is turned on.

The second solenoid hydraulic pressure control valve 7 comprises a second duty solenoid 7a for producing the shift control pressure by a solenoid force with the pilot pressure as source pressure, and a second pressure regulator valve 7b for regulating the high clutch pressure with the D range pressure as source pressure and the shift control pressure and feedback pressure as operation signal pressure. The second duty solenoid 7a is controlled in such a manner as to bring the high clutch pressure to zero when the solenoid is turned on (100% ON duty ratio), increase the high clutch pressure with a decrease in the ON duty ratio, and bring the high clutch pressure to its maximum when the solenoid is turned off.

The third solenoid hydraulic pressure control valve 8 comprises a third duty solenoid 8a for producing the shift control pressure by a solenoid force with the pilot pressure as source pressure, and a third pressure regulator valve 8b for regulating the 2-6 brake pressure with the D range pressure as source pressure and the shift control pressure and feedback pressure as operation signal pressure. The third duty solenoid 8a is controlled in such a manner as to bring the 2-6 brake pressure to zero when the solenoid is turned off, and increase the 2-6 brake pressure with an increase in the ON duty ratio when the solenoid is turned on.

The fourth solenoid hydraulic pressure control valve 9 comprises a fourth duty solenoid 9a for producing the shift control pressure by a solenoid force with the pilot pressure as source pressure, and a fourth pressure regulator valve 9b for regulating the 3-5 reverse clutch pressure with the line pressure as source pressure and the shift control pressure, R range pressure and feedback pressure as operation signal pressure. The fourth duty solenoid 9a is controlled in such a manner as to bring the 3-5 reverse clutch pressure to zero when the solenoid is turned on (100% ON duty ratio), increase the reverse clutch pressure with a decrease in the ON duty ration, and bring the reverse clutch pressure to its maximum when the solenoid is turned off.

The fifth solenoid hydraulic pressure control valve 10 comprises a fifth duty solenoid 10a for producing the shift control pressure by a solenoid force with the pilot pressure as source pressure, and a fifth pressure regulator valve 10b for regulating the low & reverse brake pressure with the D range pressure or the R range pressure as source pressure and the shift control pressure and feedback pressure as operation signal pressure. The fifth duty solenoid 10a is controlled in such a manner as to bring the low & reverse brake pressure to zero when the solenoid is turned off, and increase the low & reverse brake pressure with an increase in the ON duty ratio when the solenoid is turned on.

Referring to FIG. 3, there are provided a first hydraulic pressure switch 11 (hydraulic pressure sensing means), a second hydraulic pressure switch 12 (hydraulic pressure sensing means), a third hydraulic pressure switch 13 (hydraulic pressure sensing means), a fourth hydraulic pressure switch 14 (hydraulic pressure sensing means), a fifth hydraulic pressure switch 15 (hydraulic pressure sensing means), a manual valve 16, a pilot valve 17, a line pressure passage 19, a pilot pressure passage 20, a D range hydraulic pressure passage 21, an R range hydraulic pressure passage 22, a D & R range hydraulic pressure passage 23, a first low clutch hydraulic pressure passage 24a, a second low clutch hydraulic pressure passage 24b, a high clutch hydraulic pressure passage 25, a 2-6 brake hydraulic pressure passage 26, a 3-5 reverse clutch hydraulic pressure passage 27, and a low & reverse brake hydraulic pressure passage 28. Specifically, the first hydraulic pressure switch 11, the second hydraulic pressure switch 12, the third hydraulic pressure switch 13, the fourth hydraulic pressure switch 14 and the fifth hydraulic pressure switch 15 are arranged respectively in the first low clutch hydraulic pressure passage 24a, the high clutch hydraulic pressure passage 25, the 2-6 brake hydraulic pressure passage 26, the 3-5 reverse clutch hydraulic pressure passage 27, and the low & reverse brake hydraulic pressure passage 28, so as to sense the presence of the engagement pressure in accordance with switch signals which are turned on when the engagement pressure is present and turned off when the engagement pressure is not present.

Referring to FIGS. 5(a)–5(c), there are provided a solenoid valve 30, a first fail safe valve 31, a second fail safe valve 32, a switch valve 33, a solenoid hydraulic pressure passage 34, and a self hold hydraulic pressure passage 35.

The solenoid valve 30 is an ON/OFF switch valve which uses the solenoid force for operating the valve with the pilot pressure as source pressure. When the solenoid is turned on, the solenoid valve 30 outputs the solenoid pressure attributable to the pilot pressure, while when the solenoid is turned off, the solenoid valve 30 drains the solenoid pressure attributable to the pilot pressure.

The first fail safe valve 31 is a spool valve which is fitted with a spring for applying a biasing force in a direction opposite to a direction of operation signal pressure with the line pressure as source pressure, where the operation signal pressure is defined as the solenoid pressure (from the solenoid valve 30) and the feedback output pressure (line pressure). With the solenoid pressure outputted from the solenoid valve 30, the feedback output pressure can keep the output of the line pressure.

The second fail safe valve 32 is a spool valve for switching two positions. The second fail safe valve 32 is fitted with a spring for applying a biasing force in a direction same as a direction of a self hold pressure (line pressure) from the first fail safe valve 31 with the self hold pressure and the line pressure as operation signal pressure. When the self hold pressure is caused, the second fail safe valve 32 selects a side for supplying the D range pressure to the high clutch H/C, while when the self hold pressure is not caused, the second fail safe valve 32 selects a side for supplying the D range pressure to the low clutch LOW/C.

The switch valve 33 is disposed on the second low clutch hydraulic pressure passage 24b. The switch valve 33 is a spool valve operating with the solenoid pressure (from the solenoid valve 30) as operation signal pressure. When the solenoid pressure is not outputted from the solenoid valve 30, the switch valve 33 supplies the hydraulic pressure to both the first engagement piston chamber 1a and the second engagement piston chamber 1b. When the solenoid pressure is outputted from the solenoid valve 30, the switch valve 33 drains the hydraulic pressure of the second engagement piston chamber 1b, and supplies the hydraulic pressure to the first engagement piston chamber 1a.

In FIG. 3, there are provided an automatic transmission control unit 40 (shift controlling means) and a shift lever 50. The shift lever 50 has a P range for locking a transmission output shaft in stoppage of the vehicle, an R range for achieving the reverse gear, an N range for achieving a neutral state which shows a state in which forward movement and reverse movement are possible without outputting the input torque from the engine, a D range for achieving each of the forward gears, and an engine brake range for controlling in such a manner as to engage the low & reverse brake L & R/B at the first shift. Moreover, the shift lever 50 connects to the manual valve 16. The driver operating the shift lever 50 can shift the position of the manual valve 16, thus achieving the target shift.

Referring to FIG. 3, there are provided a vehicle speed sensor 41, a throttle sensor 42 for sensing throttle opening, an engine speed sensor 43 for sensing engine speed, a turbine speed sensor 44 for sensing turbine speed, an inhibitor switch 45 for sensing the position (range) of the shift lever 50, and an oil temperature sensor 46 for sensing oil temperature in the transmission. The vehicle speed sensor 41, the throttle sensor 42, the engine speed sensor 43, the turbine sped sensor 44, the inhibitor switch 45 and the oil temperature sensor 46 constitute the electronic shift control system in combination with the automatic transmission control unit 40. The automatic transmission control unit 40 inputs switch signals from the first hydraulic pressure switch 11, the second hydraulic pressure switch 12, the third hydraulic pressure switch 13, the fourth hydraulic pressure switch 14 and the fifth hydraulic pressure switch 15 and signals from the vehicle speed sensor 41, the throttle sensor 42, the engine speed sensor 43, the turbine speed sensor 44, the inhibitor switch 45 and the oil temperature sensor 46, so as to carry out computing in accordance with the above input information, a preprogrammed shift control regulation, a preprogrammed fail safe control regulation and the like. In accordance with the result of the computing, the automatic transmission control unit 40 outputs solenoid drive signals to the first duty solenoid 6a, the second duty solenoid 7a, the third duty solenoid 8a, the fourth duty solenoid 9a, the fifth duty solenoid 10a and the solenoid valve 30.

Described next is operation.

[Fail Safe Control Process]

FIG. 4 is a flow chart showing a fail safe control process carried out with the automatic transmission control unit 40 and a fail safe operation involved with the fail safe control process. Hereinafter, the description is made on each step.

Step S1: Turning on the automatic transmission control unit 40 can carry out a momentary self diagnosis process, with each of the first duty solenoid 6a, the second duty solenoid 7a, the third duty solenoid 8a, the fourth duty solenoid 9a and the fifth duty solenoid 10a and the solenoid valve 30 in operation.

Step S2: Input information (the switch signal from each of the first hydraulic pressure switch 11, the second hydraulic pressure switch 12, the third hydraulic pressure switch 13, the fourth hydraulic pressure switch 14 and the fifth hydraulic pressure switch 15, and the signal from each of the vehicle speed sensor 41, the throttle sensor 42, the engine speed sensor 43, the turbine speed sensor 44, the inhibitor switch 45 and the oil temperature sensor 46) to the automatic transmission control unit 40 is read in.

Step S3: Based on the input information, the routine carries out ordinary controls including the shift control and lock up control and the like.

Step S4: The routine determines whether or not the power source is open. With the power source open the routine moves to step S8, while with the power source not open the routine moves to step S5.

Step S5: When any of the six forward gears is held, the routine compares a supposedly-engaged friction element(s) supposed to be engaged at the above gear with an actually-engaged friction element(s) sensed to be actually engaged. Herein, the sensing function is based on the switch signal from each of the first hydraulic pressure switch 11, the second hydraulic pressure switch 12, the third hydraulic pressure switch 13, the fourth hydraulic pressure switch 14, and the fifth hydraulic pressure switch 15. With the supposedly-engaged friction element(s) in accordance with the actually-engaged friction element(s), the routine determines that the electric system is okay, while with the supposedly-engaged friction element(s) not in accordance with the actually-engaged friction element(s), the routine determines that the electric systems is in failure (Step S5: electric failure determining means). Substantially simultaneously with this, the routine determines whether or not each of the first duty solenoid 6a, the second duty solenoid 7a, the third duty solenoid 8a, the fourth duty solenoid 9a, the fifth duty solenoid 10a and the solenoid valve 30 is in failure. Determining eclectically okay at the step S5, the routine returns to the step S2; while determining to find electric failure at the step S5, the routine moves to step S6.

Step S6: The routine determines whether or not the power source can be turned off. Specifically, after comparing the supposedly-engaged friction element(s) supposed to be engaged at the above gear with the actually-engaged friction element(s) sensed to be actually engaged (the sensing function is based on the switch signal from each of the first hydraulic pressure switch 11, the second hydraulic pressure switch 12, the third hydraulic pressure switch 13, the fourth hydraulic pressure switch 14, the fifth hydraulic pressure switch 15), the routine determines from a state (engaged or disengaged) of the above "not in accordance with" friction element(s) whether or not the interlock is rendered with all power sources of the solenoids turned off. In the case of incapability of turning off the all power sources (in other words, the interlock is rendered with the power source of the solenoid turned off), the routine moves to step S7, while, in the case of capability of turning off the power sources (in other words, the interlock is not rendered with the power source of the solenoid turned off), the routine moves to step S8 (Step S6: all-power source OFF control determining means).

Step S7: In the case of the electric failure incapable of turning off the all power sources, the routine carries out a control for sticking the gear to an escape gear which is provided for each of the failure modes, namely, for the state (engaged or disengaged) of the "not in accordance with" friction element(s).

Step S8: The routine forcibly turns off the all power sources, based on the open power source at the step 4 or based on the determination by the all-power source OFF control determining means at the step 6.

Step S9: The spool of the first fail safe valve 31 sticks to the spring's shrink side with the self hold pressure.

Step S10: An output pressure from the first fail safe valve 31 sticks the spool of the second fail safe valve 32 to the spring's extension side.

Step S11: When being electrically turned off, the second duty solenoid 7a and the fourth duty solenoid 9a output the engagement pressure, namely, the high clutch pressure and the 3-5 reverse clutch pressure respectively. On the other hand, the other solenoids (not outputting the engagement pressure when being electrically turned off) are so rendered to have a different polarity. With this, the routine sticks the gear to the fifth speed 5TH which can be achieved by the engagement of the high clutch H/C and the 3-5 reverse clutch 3-5 R/C.

Step S12: The routine determines whether or not an ignition key is turned off. With the ignition key turned off, the routine moves to step S13.

Step S13: The routine cuts the source pressure of the first fail safe valve 31 and releases the self hold pressure.

Step S14: The spool of the first fail safe valve 31 makes a stroke to the spring's extension side.

Step S15: With the output pressure from the first fail safe valve 31 cut, the hydraulic pressure applied from the spring's opposite side allows the spool of the second fail safe valve 32 to make a stroke to the spring's shrink side (at a restart after the ignition key is turned off).

Step S16: The D range pressure is directly inputted to the low clutch LOW/C, while cutting the source pressure of the high clutch H/C (at the restart after the ignition key is turned off).

Step S17: The routine sticks the gear to the third speed 3RD which can be achieved by the engagement of the low clutch LOW/C and the 3-5 reverse clutch 3-5 R/C (at the restart after the ignition key is turned off).

Hereinabove, the step S7 to step S17 correspond to the electric failure interlock escaping means as set forth in claims.

[Ordinary State Free of Electric Failure]

In the ordinary state free of the electric failure, the routine takes sequentially the step S1, the step S2, the step S3, the step S4, and the step S5 in the flow chart in FIG. 4. Then, the routine moves from the step S5 back to the step S2, followed by the repeated sequential movement of taking the step S3, the step S4 and the step S5.

Therefore at the step S3, the routine, for example at D range travel of the vehicle, compares the operation point (determined from the vehicular speed sensed with the vehicle speed sensor 41 and from the throttle opening sensed with the throttle sensor 42) with a predetermined shift schedule. The operation point crossing a shift line of the shift schedule carries out an ordinary shift control, namely, the gear of the operation point before the crossing is shifted (up or down) to the gear of the operation point after the crossing.

[Electric Failure Incapable of Turning Off All Power Sources]

In the electric failure incapable of turning off the all power sources, the routine takes sequentially the step S1, the step S2, the step S3, the step S4, the step S5, the step S6 and the step S7 in the flow chart in FIG. 4. At the step S7, the routine carries out the fail safe shift control for sticking the gear to the escape gear.

With this, in the case of the electric failure (incapable of turning off all power sources) which is, for example, attributable to a open or short of a part of the circuit, the routine carries out the fail safe shift control for sticking the gear to the escape gear, which control can be achieved by the operable solenoid and the like.

[Electric Failure Capable of Turning Off All Power Sources—Before Turning Off Ignition Key]

In the case of the electric failure (capable of turning off the all power sources) and before the ignition key is turned off, the routine sequentially takes the step S1, the step S2, the step S3, the step S4, the step S5, the step S6, the step S8, the step S9, the step S10 and the step S11 in the flow chart in FIG. 4. At the step S11, the routine sticks the gear to the fifth speed 5TH by differentiating in polarity the second duty solenoid 7a and the fourth duty solenoid 9a from the other solenoids.

In other words, described as below. The solenoid valve 30 outputting even once the solenoid pressure before the electric failure is caused may switch the spool of the first fail safe valve 31 to the spring's shrink side, as is seen in FIG. 5(b). Substantially simultaneously with this, the output pressure from the first fail safe valve 31 may act in the direction same as the direction of the solenoid pressure, thus causing the self hold pressure for holding the spool in the present position (switched position). Whether or not the solenoid pressure is outputted from the solenoid valve 30, the thus caused self hold pressure may stick the first fail safe valve 31 on the spring's shrink side, thus holding the output pressure. Then, the second fail safe valve 32 sticking to the spring's shrink extension side with the output pressure applied from the first fail safe valve 31 allows the spool to be held in the position for supplying the D range pressure to the second solenoid hydraulic pressure control valve 7 of the high clutch H/C.

In sum, the second duty solenoid 7a and the fourth duty solenoid 9a are so polarized as to output the high clutch pressure and the 3-5 reverse clutch pressure respectively when the second duty solenoid 7a and the fourth duty solenoid 9a are electrically turned off. On the other hand, the other duty solenoids do not output the engagement pressure when the other duty solenoids are electrically turned off. With this, turning off the all power sources may engage the high clutch H/C and the 3-5 reverse clutch 3-5 R/C, thus sticking the gear to the fifth speed 5TH (see FIG. 2).

[Electric Failure Capable of Turning Off All Power Sources—After Turning Off Ignition Key]

In the case of the electric failure (capable of turning off the all power sources) and after the ignition key is turned off, the routine sequentially takes the step S12, the step S13, the step S14, the step S15, the step S16, and the step S17 in the flow chart in FIG. 4. At the step S17, the routine sticks the gear to the third speed 3RD.

In other words, described as below. Turning off the ignition key may stop an oil pump, thus turning off the operation of the hydraulic pressure, and further thus cutting the source pressure of the first fail safe valve 31 and releasing the self hold pressure. With this, the spool of the first fail safe valve 31 makes the stroke to the spring's extension side. In this state, turning on the ignition key for restart may recover the hydraulic pressure operation. Then, as is seen in FIG. 5(c), the above cut output pressure of the first fail safe valve 31 may stick the spool of the second fail safe valve 32 to the spring's shrink side by the hydraulic pressure applied to the spring's opposite side, thus inputting the D range pressure directly to the low clutch LOW/C and cutting the source pressure of the high clutch H/C.

In sum, restarting the routine after turning off the ignition key may engage the low clutch LOW/C (attributable to the turned on hydraulic pressure [from the oil pump] after the turned off hydraulic pressure [from the oil pump]) and engage the 3-5 reverse clutch 3-5 R/C (attributable to all power sources turned off), thus sticking the gear to the third speed 3RD (see FIG. 2).

FIG. 5(a) summarizes the fail safe operations before and after the ignition key is turned off in the case of the electric failure capable of turning off the all power sources.

In addition, in the case of the electric failure determined to be power source open at the step 4, the routine takes sequentially the step S4, the step 8, the step 9, the step 10, the step 11, the step 12, the step 13, the step 14, the step 15, the step 16, and the step 17.

Described next is effect.

(1) When any of the forward gears is held in the case of the electric failure caused to the traveling vehicle, the routine compares at the step S5 the supposedly-engaged friction element(s) which is (are) supposed to be engaged at the above forward gear with the actually-engaged friction element(s) which is (are) sensed to be actually engaged based on a sensing function by the switch signal from each of the first hydraulic pressure switch 11, the second hydraulic pressure switch 12, the third hydraulic pressure switch 13, the fourth hydraulic pressure switch 14 and the fifth hydraulic pressure switch 15. With the supposedly-engaged friction element(s) not in accordance with the actually-engaged friction element(s), the routine determines that the electric systems is in failure. Then, in this electric failure state, the routine moves to the step S6 and the subsequent steps so as to stick the gear to its given position, thus eliminating sleeping failure (which is insensible due to stick failure of the fail safe valve) and further thus securely preventing the interlock. In addition, eliminating the need for providing between the solenoid hydraulic pressure control valves and the friction elements the fail safe valve operating with the pressure of each of the friction elements as operation signal pressure can secure high shift controllability which is not, in a period of shift, restricted in terms of hydraulic pressure control range of each of the friction elements.

The conventional technology shows the fail safe valve operating with the pressure of each of the friction elements as operation signal pressure. Unlike the conventional technology disclosing that the electric failure sensing function and the electric failure interlock escaping function are assumed responsibility for by the fail safe valve alone that operates with the pressure of each of the friction elements as operation signal pressure, the mode for carrying out the invention has divided functions, namely, the electric failure sensing function is carried out by the electric failure determining means with the sensing function based on the switch signals from the first hydraulic pressure switch 11, the second hydraulic pressure switch 12, the third hydraulic pressure switch 13, the fourth hydraulic pressure switch 14, the fifth hydraulic pressure switch 15, while the electric failure interlock escaping function is carried out by the electric failure interlock escaping means for sticking the gear to its given position with the escaping function based on an electric failure determination result.

(2) At the step S6, with the electric failure determined to occur, the routine determines from the state of the "not in accordance with" friction element(s) (engaged or disengaged) whether or not the all power sources can be turned off. In the case of the incapability of turning off the all power sources, the routine moves to the step S7, to thereby carry out the control for sticking the gear to the escape gear which is provided for each of the failure modes. In the case of the capability of turning off the all power sources, the routine moves to the step S8 and the subsequent steps, so as to stick the gear to its given position with the all power sources turned off. With this, in the case of the electric failure with the capability of turning off the all power sources, the routine carries out an easy control using the solenoid polarity with the all power sources turned off, thus sticking the gear to its given position.

(3) With the electric failure determined at the step S5 to occur and with the all power sources determined at the step S6 to be turnable off, the routine turns off the all power sources and sticks (controls) the gear to the fifth speed 5TH among the six forward gears, thus bringing about the gear change from the fourth speed 4TH to the fifth speed 5TH, from the fifth speed 5TH to the fifth speed 5TH, and from the sixth speed 6TH to the fifth speed 5TH in the electric failure which may be caused to the high gear (fourth speed 4TH, fifth speed 5TH, and sixth speed 6TH) traveling vehicle. As a result, the above gears can prevent any excessive shock including a down spike and an up spike which may be caused by the gear change, for example, from the fourth speed 4TH to the sixth speed 6TH.

Specifically, the gear change from the fourth speed 4TH to the fifth speed 5TH in the electric failure can reduce the up spike, as is seen in FIG. 6, since change in turbine speed of the fourth speed 4TH shifted to the fifth speed 5TH is smaller than change in turbine speed of the fourth speed 4TH shifted to the sixth speed 6TH. In addition, as is seen in FIG. 7, the gear change from the sixth speed 6TH to the fifth speed 5TH in the electric failure is a down shift, therefore, does not cause the up spike.

Figure 8A:
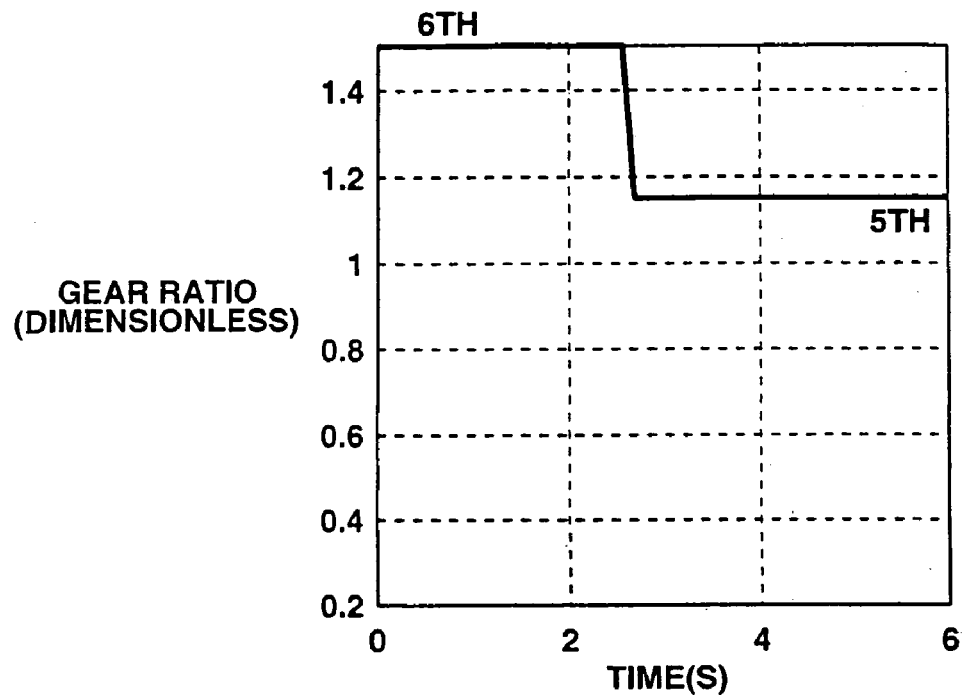
FIGS. 8(a) and 8(b) show a resultant diagram of a down shift simulation of changing the gear from sixth speed 6TH to fifth speed 5TH in the case of fuse cut (electric failure) caused to the vehicle traveling at 250 km/h with sixth speed 6TH.
Figure 8B:
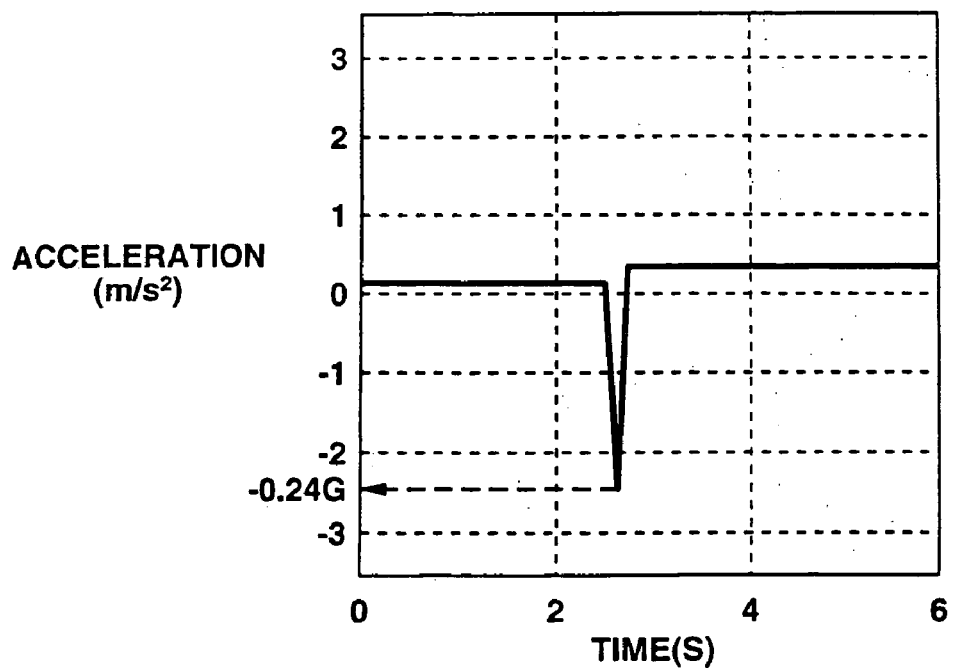
Figure 9:
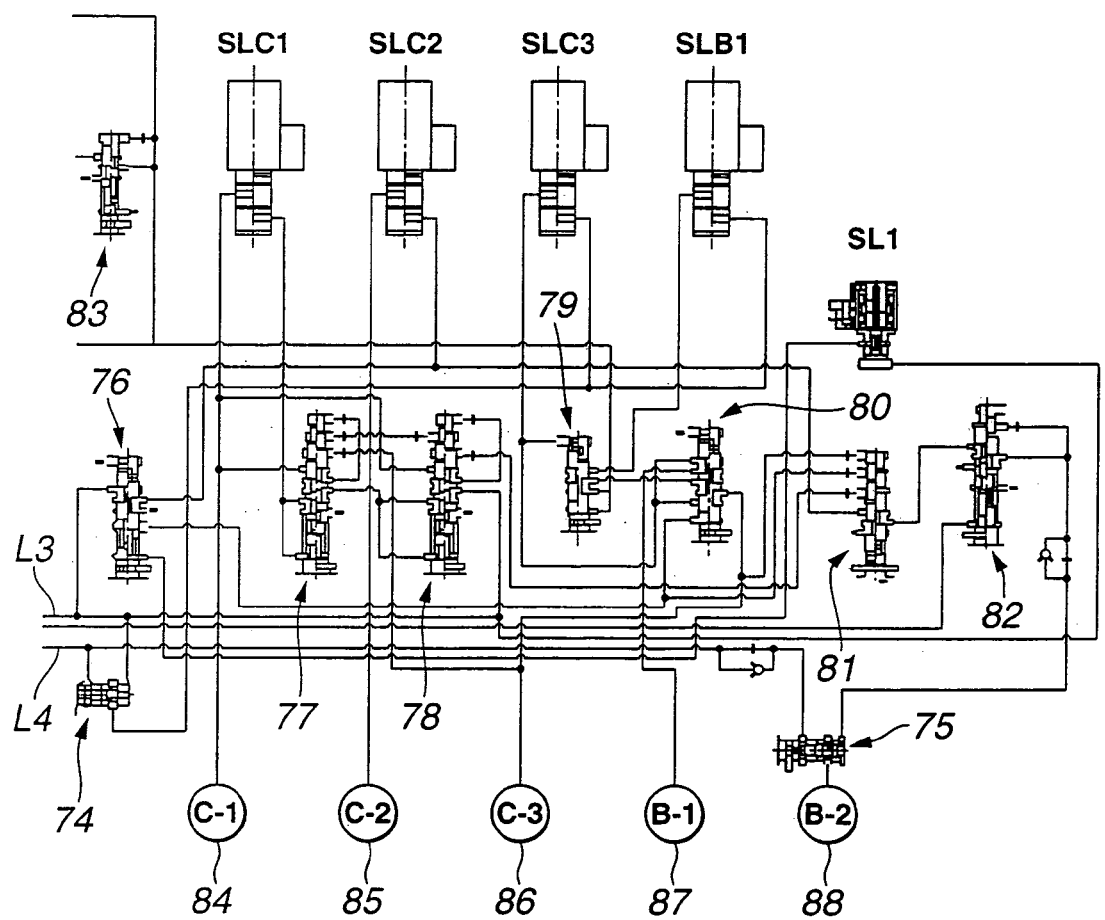
FIG. 9 shows a hydraulic pressure circuit diagram showing a shift control system of an automatic transmission, according to a conventional technology.
Figure 10:
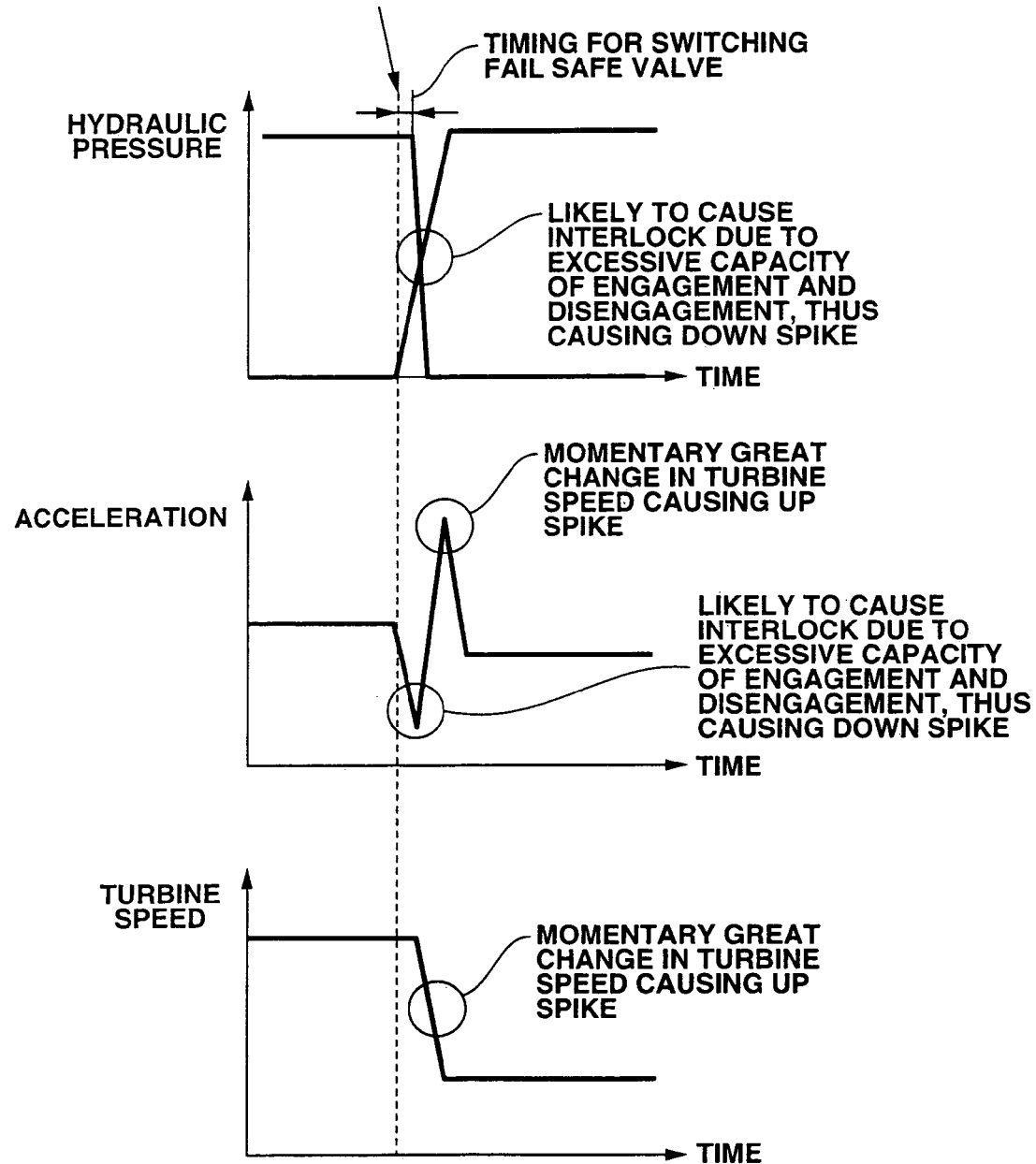
FIG. 10 shows characteristics of hydraulic pressure, acceleration and turbine speed when the shift control system of the automatic transmission according to the conventional technology changes the gear from fourth speed 4TH to sixth speed 6TH (up shift) in an electric failure.
Figure 11A:
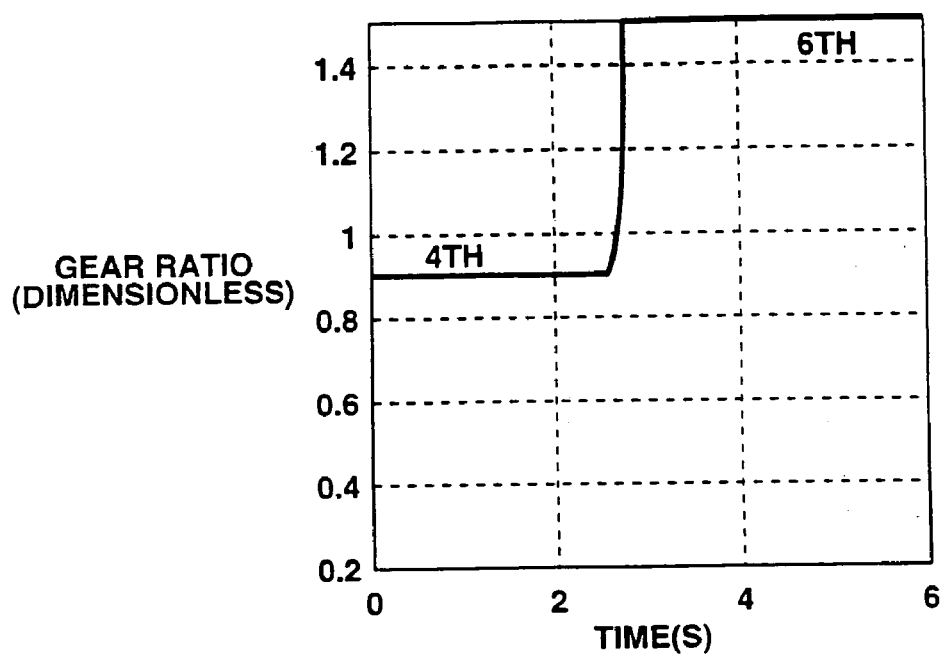
FIGS. 11(a) and 11(b) show a resultant diagram of an up shift simulation of changing the gear from fourth speed 4TH to sixth speed 6TH in the case of fuse cut (electric failure) caused to the vehicle traveling at 230 km/h with fourth speed 4TH.
Figure 11B:
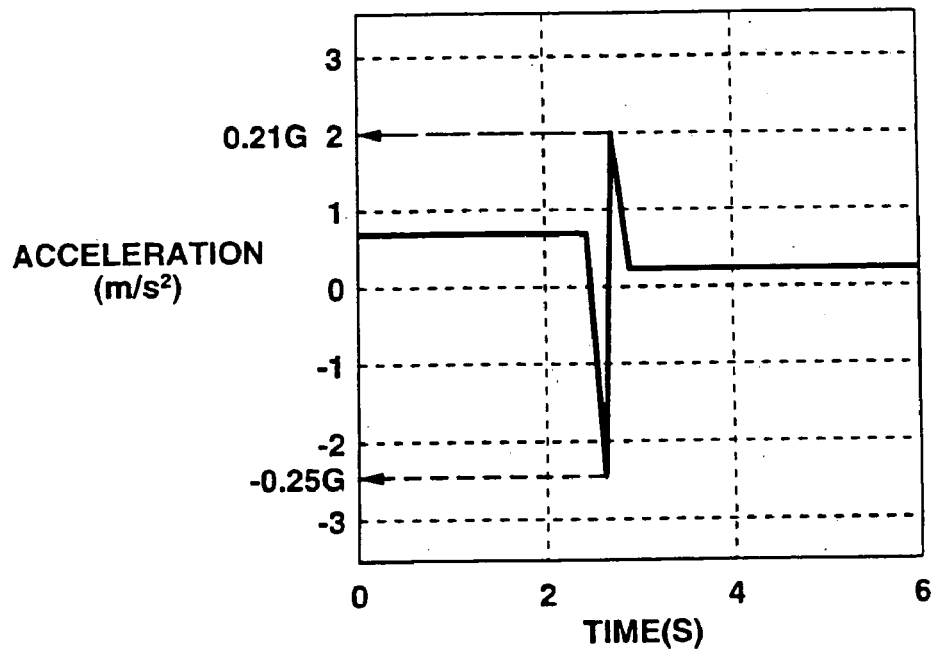

En passant, FIG. 8 shows a resultant down shift simulation of changing the gear from the sixth speed 6TH to the fifth speed 5TH in the case of fuse cut (electric failure) caused to the vehicle traveling at 250 km/h with the sixth speed 6TH. The down shift simulation from the sixth speed 6TH to the fifth speed 5TH has its deceleration suppressed to −0.24 G (<0.4 G).

(4) With the electric failure determined at the step S5 to occur and with the all power sources determined at the step S6 to be turnable off:

Before turning off the ignition key and with the all power sources turned off, the routine sticks the gear to the fifth speed 5TH by engaging the 3-5 reverse clutch 3-5 R/C and the high clutch H/C.

For restart after turning off the ignition key, the routine sticks the gear to the third speed 3RD by engaging the low clutch LOW/C and the 3-5 reverse clutch 3-5 R/C.

Thus, the routine can prevent the excessive shock which may be caused in the electric failure to the high gear (fourth speed 4TH, fifth speed 5TH and sixth speed 6TH) traveling vehicle and can compatibly secure restartability after the electric failure.

(5) The solenoid valve 30, the first fail safe valve 31 and the second fail safe valve 32 constitute the system that can select two gears in the electric failure. The thus constituted system can facilitate valve layout and make the control valve unit smaller, as compared with the conventional technology which discloses three long (overall length) fail safe valves having two shifts for selecting the two gears in the electric failure.

(6) The solenoid valve 30 is a solenoid valve for causing the operation signal pressure of the switch valve 33 disposed on the engagement hydraulic pressure passage to the low clutch LOW/C having the first engagement piston chamber 1a and the second engagement piston chamber 1b which are engaged in accordance with engagement capacity request. Moreover, the solenoid valve 30 constitutes the fail safe valve. The above common solenoid valve 30 helps reduce the number of component parts and cost, as compared with the solenoid valves equipped for carrying out the above respective functions.

(Another Mode for Carrying Out)

The shift control system of the automatic transmission under the present invention has been described above according to the first mode for carrying out the invention. The specific constitution is, however, not limited to the first mode for carrying out the invention. Without deviation from the gist of the present invention set forth in each of the claims, design change, design addition and the like are allowed.

For example, according to the first mode for carrying out, the above described applicability is to the automatic transmission that has the six forward gears and the one reverse gear. The applicability is also to an automatic transmission that has four forward gears, five forward gears, seven forward gears and the like, provided that such automatic transmission has a hydraulic pressure circuit constitution which has solenoid hydraulic pressure control valves for controlling individually engagement pressures to a plurality of friction elements related to shift of the automatic transmission.

In addition, according to the first mode for carrying out, the engagement pressure of the friction element is sensed with the hydraulic switch. A hydraulic pressure sensor capable of sensing a state (engagement and disengagement) is, however, replaceable.

In addition, according to the first mode for carrying out, the solenoid valve 30 sending the operation signal pressure to the first fail safe valve and the second safe valve is of a selectable valve type for turning on and off. The present invention is, however, not limited to the above type.

What is claimed is:

1. A shift control system of an automatic transmission, a hydraulic pressure circuit having a constitution provided with solenoid hydraulic pressure control valves for controlling individually an engagement pressure and a disengagement pressure to a plurality of friction elements related to a shift of the automatic transmission, the shift control system of the automatic transmission including a shift controlling means for achieving a plurality of forward gears by outputting the following commands when the shift is requested;
   an engagement pressure control command to the solenoid hydraulic pressure control valves of the friction elements which is disengaged at a gear before the shift and is engaged at a gear after the shift, and
   a disengagement pressure control command to the solenoid hydraulic pressure control valves of the friction elements which is engaged at the gear before the shift and is disengaged at the gear after the shift,
   the shift control system of the automatic transmission comprising:
   1) a hydraulic pressure sensing means for sensing whether or not a pressure of the friction elements is present, the hydraulic pressure sensing means being disposed on the plurality of the friction elements or each of engagement-disengagement hydraulic pressure passages;
   2) an electric failure determining means for determining that an electric system is in failure through:
      a comparison between the following friction elements, when a hydraulic pressure sensing signal is inputted from the hydraulic pressure sensing means and when any of the forward gears is held:
         a supposedly-engaged friction element of the friction elements which is supposed to be engaged at the any of the forward gears, and
         an actually-engaged friction element of the friction elements which is sensed by the hydraulic pressure sensing signal to be actually engaged, and
      a determination that the supposedly-engaged friction element is not in accordance with the actually-engaged friction element; and
   3) an electric failure interlock escaping means for sticking the gear of the automatic transmission to a given gear when the electric failure determining means determines that the electric failure is caused.

2. The shift control system of the automatic transmission as claimed in claim 1, wherein
   the shift control system further comprises an all-power source OFF control determining means for determining, based on an engagement-disengagement state of the friction elements, a capability of turning off all power source, when the electric failure determining means determines that the electric failure is caused, and
   when the all power source is determined to be incapable of being turned off, the electric failure interlock escaping means is so controlled as to stick the gear of the automatic transmission to an escape gear provided for each failure mode; while when the all power source is determined to be capable of being turned off, the electric failure interlock escaping means is so controlled, with the all power source turned off, as to stick the gear of the automatic transmission to the given gear.

3. The shift control system of the automatic transmission as claimed in claim 2, wherein
   the shift controlling means is a means for achieving six forward gears, and
   the electric failure interlock escaping means is a means for turning off the all power source and sticking the gear to a fifth speed when:
      the electric failure determining means determines that the electric failure is caused, and
      the all-power source OFF control determining means determines that the all power source is capable of being turned off.

4. The shift control system of the automatic transmission as claimed in claim 3, wherein
   the shift controlling means is a means for achieving a third speed by engaging a first friction element with a second friction element as a common friction element and for achieving a fifth speed by engaging a third friction element with the second friction element as the common friction element,
   the solenoid hydraulic pressure control valves include a fourth solenoid hydraulic pressure control valve for the second friction element and a second solenoid hydraulic pressure control valve for the third friction element, the fourth solenoid hydraulic pressure control valve and the second solenoid hydraulic pressure control valve supplying the engagement pressure, respectively, to the second friction element and the third friction element in an electrically turned off state, and
   a fail safe valve is disposed on an engagement hydraulic pressure passage of the first friction element and on an engagement hydraulic pressure passage of the third friction element,
      when the all power source is turned off and before an ignition key is turned off, the fail safe valve supplying the engagement pressure to the third friction element while cutting the engagement pressure of the first friction element, and
      for a restart after the ignition key is turned off, the fail safe valve cutting the engagement pressure of the third friction element while supplying the engagement pressure to the first friction element.

5. The shift control system of the automatic transmission as claimed in claim 4, wherein
   the fail safe valve includes:
   a solenoid valve,
   a first fail safe valve outputting a hydraulic pressure with a solenoid pressure outputted from the solenoid valve as an operation signal pressure, the first fail safe valve having a self hold function for holding a self hydraulic pressure output by a self output hydraulic pressure with the outputted hydraulic pressure operating in a direction same as a direction of the solenoid pressure, and
   a second fail safe valve selecting, with the hydraulic pressure outputted from the first fail safe valve as an operation signal pressure, a side for supplying the engagement pressure to the third friction element when the hydraulic pressure of the first fail safe valve is outputted, while the second fail safe valve selecting, with the hydraulic pressure outputted from the first fail safe valve as the operation signal pressure, a side for supplying the engagement pressure to the first friction element when the hydraulic pressure of the first fail safe valve is not outputted.

6. The shift control system of the automatic transmission as claimed in claim 5, wherein the first friction element has a first engagement piston chamber and a second engagement piston chamber which are engageable in accordance with an engagement capacity request, a switch valve is disposed on the engagement hydraulic pressure passage to the first friction element, the switch valve making a first switching operation of supplying the hydraulic pressure to both of the first engagement piston chamber and the second engagement piston chamber and a second switching operation of supplying the hydraulic pressure to the first engagement piston chamber, and the solenoid valve acts as a one common solenoid valve for causing an operation signal pressure of the switch valve and for constituting the fail safe valve.

* * * * *